Figure 1:
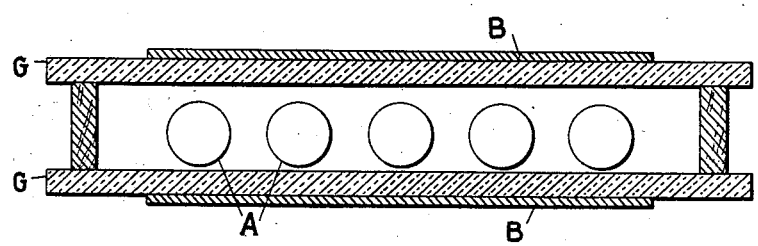

July 11, 1933.  E. SCHWEITZER  1,917,465
PROCESS AND APPARATUS FOR TESTING EVACUATED AMPULES
Filed Aug. 7, 1931  3 Sheets-Sheet 1

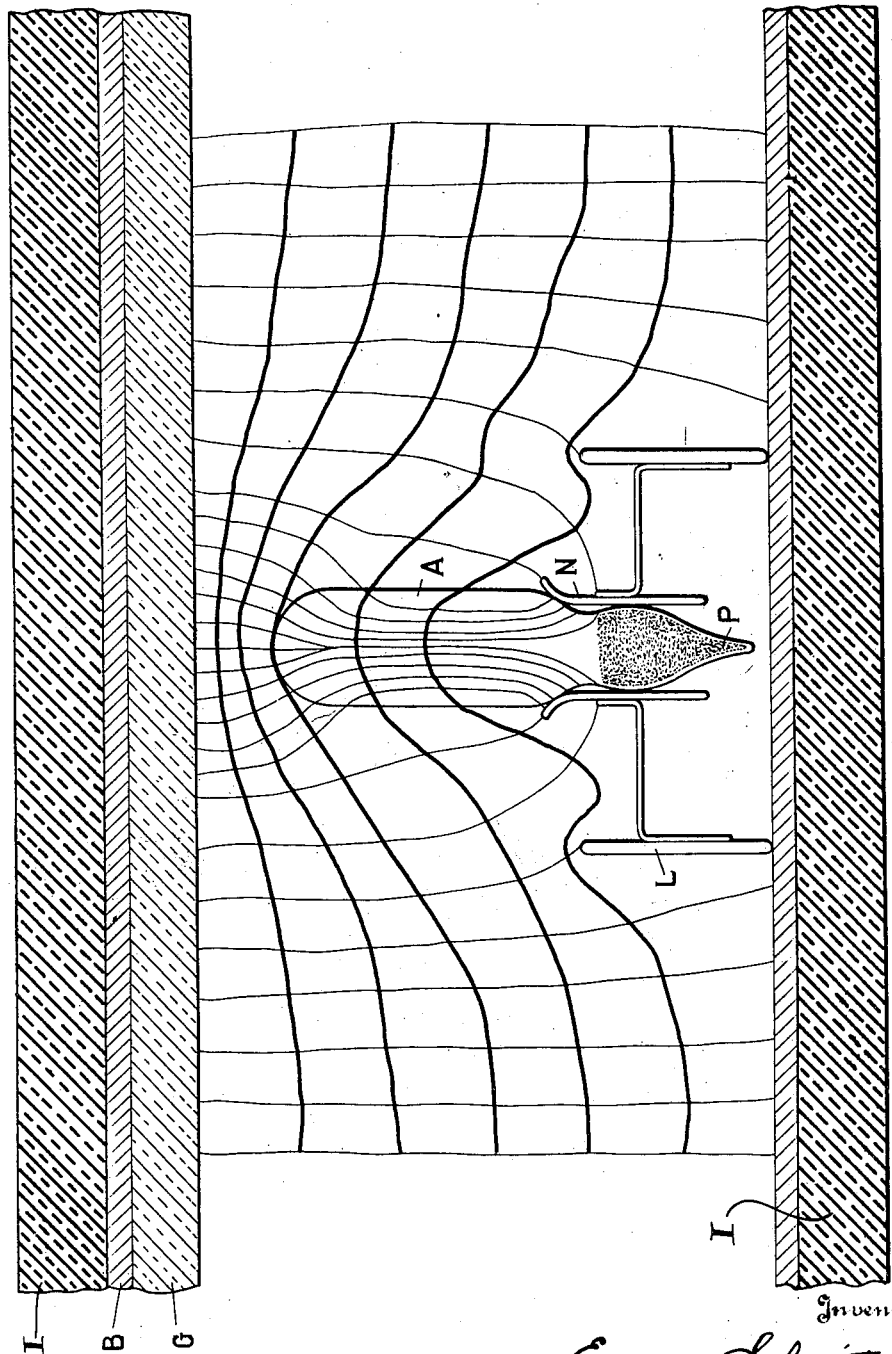

July 11, 1933. E. SCHWEITZER 1,917,465
PROCESS AND APPARATUS FOR TESTING EVACUATED AMPULES
Filed Aug. 7, 1931 3 Sheets-Sheet 3
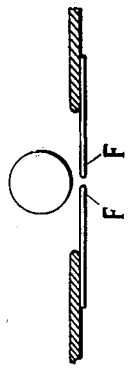
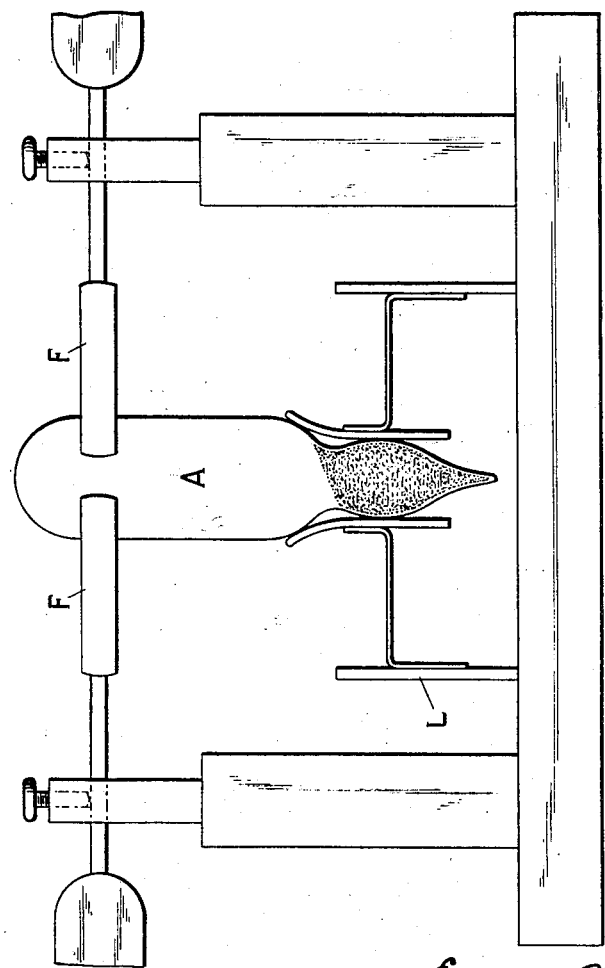

Patented July 11, 1933

1,917,465

UNITED STATES PATENT OFFICE

EUGEN SCHWEITZER, OF FRANKFORT-ON-THE-MAIN, GERMANY, ASSIGNOR TO I. G. FARBENINDUSTRIE AKTIENGESELLSCHAFT, OF FRANKFORT-ON-THE-MAIN, GERMANY

PROCESS AND APPARATUS FOR TESTING EVACUATED AMPULES

Application filed August 7, 1931, Serial No. 555,849, and in Germany August 11, 1930.

My present invention relates to a process and apparatus for testing evacuated ampules.

Many pharmaceutical and chemical preparations are known to decompose in the presence of air and are therefore stored in evacuated glass ampules which, before leaving the factory, must be tested to ensure that they are entirely free from air.

The visual or hydraulic testing methods hitherto used only permit of rejection, as insufficiently free from air, of ampules which show cracks, fissures or similar damage, and do not permit of detection of ampules in which air is present owing to some other cause, for instance, owing to an obstruction or stoppage in the duct by which they were connected to the exhausting pump or to inaccurate sealing of the ampul.

The method of testing in the electric field of the known Tesla transformer has hitherto met with but little success, since the ampul could not be excited with certainty, so as to become luminous; moreover, the luminescense did not give a certain indication of the degree of the vacuum in the ampul.

When the substances contained in the ampules produce vapours—in the case of highly evacuated ampules even small traces are sufficient—it is considerably more difficult to produce the phenomena of luminescence, and it is not possible to distinguish between the phenomena due to air residues, the detection of which is the very object of the examination, and those due to the vapours produced in the ampul.

If, for instance, large evacuated vessels are brought near to the ends of a Tesla transformer, a few of them will become luminous, but most of them will at first remain dark and become luminous only after they have come into contact with the conductors of the transformer and are in electrical connection with them by sparking. The luminescence diminishes very rapidly as the distance from the ends of the coil increases; the intensity of the luminescence is a maximum when sparks impinge directly on the evacuated vessel. If, however, the vessel is a small ampul containing a substance, for instance, salvarsan, the luminescence is very faint. As a rule, the ampul can only be excited so that it becomes luminous after it has been brought together and in sparking contact with a conductor of the transformer repeatedly and for a long time. In order to obtain a sufficient brightness, the ampul must be brought so close to a conductor that sparking occurs, the sparks being earthed by the hand on the side remote from the transformer. These sparks have the form of single threads or bundles which in part extend into the ampul and thus render it impossible to determine the degree of evacuation from the colour or structure of the luminescence. The brightness of the sparks exceeds the luminescence in the ampul to a degree which interferes with the examination. There is also the danger that the ampul may be punctured by the sparks. Furthermore, according to the known methods it was not possible to test several ampules simultaneously, since the spark travels only to a single ampul.

All these difficulties have hindered the practical application of the ordinary Tesla system for testing the vacuum in the ampules.

This invention provides a process and apparatus which permit examination of the degree of vacuum with certainty and rapidity, regardless of the presence of foreign vapours, and are applicable for the examination of ampules carried on a conveying band, without the necessity for removing them from the band. The invention furthermore permits simultaneous observation of a whole group of, say, 20 to 30 ampules, and examination of about 120 ampules per minute by a single operative.

If an evacuated, excited ampul is brought into a field of high frequency produced by connecting the ends of the coil of a Tesla transformer with two parallel metal plates, very powerful sparks impinge on the ends of the ampul and render it distinctly luminous, even when filled. But the colour and the structure of the luminescence in the ampul are not yet characteristic of the pressure existing inside it.

According to one feature of the invention, thick layers of a puncture-proof dielectric medium, for instance two glass plates, are placed in the condenser field. The condenser plates can now be brought in very close proximity with each other without the occurrence of sparking. The action of the dielectrics is as follows: The individual elements of the surfaces of the glass plates which face one another are not in conductive connection and their electric potentials cannot therefore be equalized. If, therefore, evacuated vessels, for instance, ampules, are placed between the glass plates and the surfaces of the dielectrics charged by the displacement currents passing through the dielectric medium, there is no possibility that only a single, powerful spark will travel to a particular ampul, but each point of the surface of the glass plates will be discharged by way of an ampul. Thus there are produced very fine fibred, relatively dark bundles of sparks which travel from the dielectrics to the ampul in the form of rays. Inside the ampul there is produced a uniform and quiescent luminescence of high intensity and having distinctly differentiated stratifications. The luminescence is much more intense than in a condenser having no dielectric and appears physiologically to be still brighter, since the disturbances caused by intense single sparks are eliminated. All the ampules brought into the condenser glow in a colour and structure characteristic of the pressure and the contents. Since the condenser may contain simultaneously a large number of ampules, the latter may remain therein for a longer time. This may be of importance, because if the ampules contain substances which produce vapors, the characteristic glow of these vapors increases in intensity the longer the ampul remains in the field. When the ampul contains residues of air, it will glow, regardless of the presence of other vapors, in the typical red-violet color characteristic of nitrogen.

Fig. 1 of the accompanying drawings illustrates diagrammatically a testing condenser of the kind above described: B are the condenser plates, G the glass plates and A the ampules to be examined.

According to a further feature of the invention, the lower glass plate may be omitted without impairing the phenomena of luminescence, and the lower coating of the condenser replaced by a travelling band of conductive material, which may carry holders of conductive material into which the ampules are inserted in inverted position. The delicate top and the small head of the ampul which is filled with substance are situated in a zone which is shielded electrostatically and is not in the electric field, and are thus protected against sparking which might injure the top or the substance. The vertical arrangement of the ampul also permits more convenient observation of the luminescence and at the same time, offers the maximum field of observation. An example of this form of the invention is illustrated diagrammatically in Fig. 2 of the accompanying drawings, in which I is an insulating material, B is the upper coating of the condenser, G is the glass plate, N is the holder conductively attached to the travelling band L and A are the ampules containing a substance P in the lower part. The band conveys the ampules from front to back through the condenser. The ampules are spaced at distances of 3 cm., and extend upwardly to a point about 4 to 6 mm. distant from the glass plate G. The top and sides of the upper metal coating are covered with thick coatings of insulating material. The lower coating is formed by the metallic conveying band itself. The field of force in the condenser is deformed by the ampul but is otherwise uniform, as represented in Fig. 2, which also shows in section the equipotential surfaces as trajectories at right angles to the lines of force. Between the glass plate G and the bottom of the inverted ampul, the equipotential surfaces are so close together that the gradient is sufficiently high to cause a lively discharge of showers of sparks in the direction of the lines of force, which now become lines of current flow. Inside the ampul the lines of current flow are concentrated in high density, thus producing an intense luminescence, and enter the upper end of the holder at the constricted portion of the ampul.

The ampules must be excited before they travel through the condenser, for non-excited ampules may erroneously be rejected as defective and containing air. In carrying out the invention the ampules are accordingly brought into intimate contact with a high frequency spark gap, before they enter the testing condenser. For this purpose, the ends of the electrodes of a high frequency spark gap may be constructed in the form of spring jaws, which are nearly in contact in the normal position, but are separated by each ampul as it is moved between them by the conveying band, so that a powerful and increasing spark now winds about the ampul which is thereby excited with certainty. In this case, also, the sensitive portions of the ampul are completely protected. The springs involve the great advantage that each ampul is exposed to the exciting spark for a particularly long time and no energy is wasted by useless sparking across the space between successive ampules.

Fig. 3 of the accompanying drawings shows diagrammatically an arrangement for exciting the ampules. L is the conveyer band, A is the ampul, F are the springs between which the exciting sparks are produced. Successive stages in the passage of an ampul through the springs are shown diagrammatically in Figs. 3a, 3b and 3c.

Figure 4:
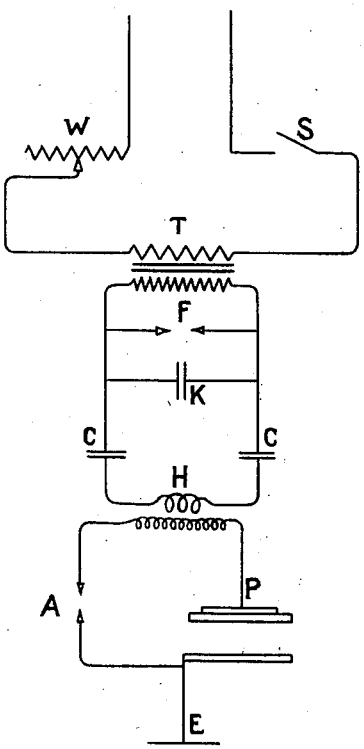

Fig. 4 illustrates suitable electrical connections in the testing device, in which an alternating current supply serves as the source of current. The transformer T, which is connected in series with an adjustable resistance W, has a transformation ratio of 220 to 20,000 volts, and a normal secondary output (power) of 1 kilovolt-ampere. On the side of high voltage is applied the Zenneck connection for the production of high frequency currents. The capacities employed are Leyden jars C having each a capacity of 200 cm. This kind of connection advantageously is modified by inserting further capacities K in parallel with the high frequency spark gap F. In the case of resonance there are thus produced particularly powerful currents of high frequency which are transmitted in the high frequency transformer H (which has on the primary side about 75 windings and on the secondary side about 1000 windings) to the oscillatory circuit proper serving for the examination. In this circuit the spark gap A for exciting the ampules must influence the field in the testing condenser P as little as possible; moreover, the lower coating of the condenser and one spring of the exciting spark gap must be earthed on account of their proximity to the conveying band, preferably by a series connection of A and P of the kind shown in Fig. 4. The oscillatory circuits must be adapted to one another by varying the capacities.

I claim:

1. A method of testing the vacuum of evacuated ampules with the aid of electric fields of high frequency, which consists in first exciting the ampules by means of a high frequency spark gap and then bringing them into a field of high frequency formed by two metallic coatings between which are interposed one or more layers of a puncture-proof dielectric medium.

2. An apparatus for testing the vacuum of evacuated ampules with the aid of electric fields of high frequency, comprising exciting means formed by two electrodes constructed in the form of springs which are nearly in contact in their normal positions and are separated by the ampules passing between them on a metallic conveying band carrying conductive holders for supporting the ampules, said conveying band forming the lower coating of a testing condenser containing a puncture-proof dielectric medium interposed between the upper coating of the condenser and the ampules carried in the holder.

In testimony whereof, I affix my signature.

EUGEN SCHWEITZER.